May 1, 1928. 1,668,095
K. WEIGELT
METHOD OF SEALING TUNGSTEN AND LIKE METALS IN GLASS
AND SEAL PRODUCED BY SUCH METHOD
Filed July 1, 1926
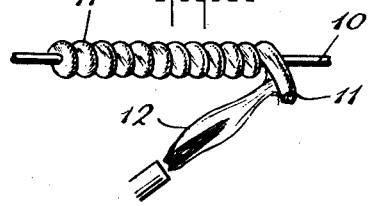
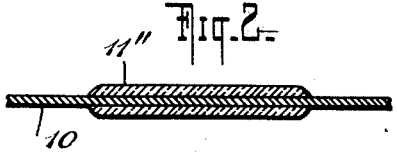
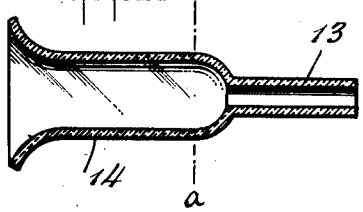
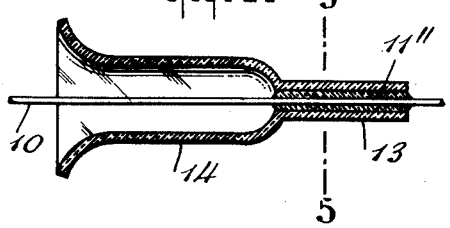
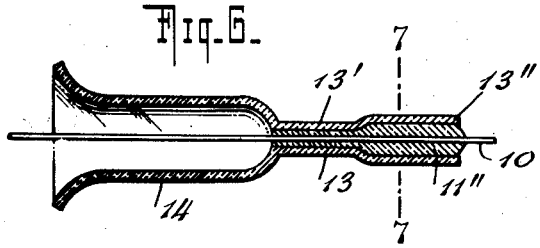
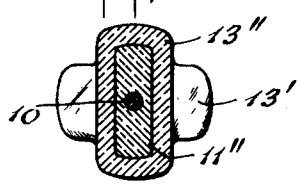
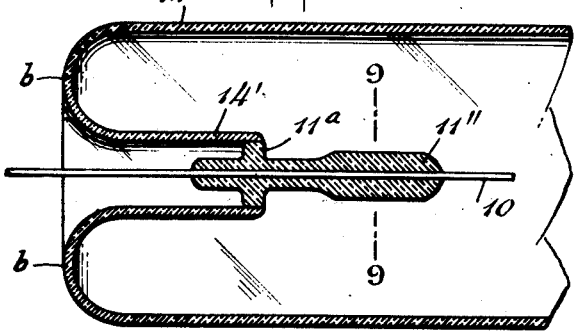
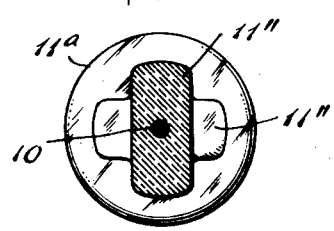
INVENTOR
KARL WEIGELT
BY
ATTORNEYS Patented May 1, 1928.

1,668,095

UNITED STATES PATENT OFFICE.

KARL WEIGELT, OF NEW YORK, N. Y.

METHOD OF SEALING TUNGSTEN AND LIKE METALS IN GLASS AND SEAL PRODUCED BY SUCH METHOD.

Application filed July 1, 1926. Serial No. 119,789.

In many types of electrical apparatus using glass, particularly when a partial vacuum is employed within the apparatus, considerable difficulty has been experienced at the points where the lead-in wires extend through the glass. The requirements call for an air-tight character of the joint, so as to prevent air from leaking into the apparatus and impairing the vacuum, and also for keeping the glass from cracking at the seal or adjacent thereto. My present invention provides novel and very efficient means for securing these desirable results, particularly when the part to be sealed in the glass is a wire of tungsten, molybdenum, or metal of similar characteristics.

In carrying out my invention, I coil around the wire, rod, or other metal part to be sealed in the glass, a rod or other elongated body made of the glass which is to form the seal, and then complete the article in accordance with the conditions of the particular case.

Two specific preferred embodiments of my invention will now be described in detail with reference to the accompanying drawings, in which Fig. 1 is a perspective detail view illustrating one of the steps in my improved method; Fig. 2 is a longitudinal section showing a further step in the manufacture of any improved article; Fig. 3 is a longitudinal section through a glass sleeve used in one form of my invention; Fig. 4 is a longitudinal section showing such sleeve applied to the intermediate product illustrated by Fig. 2; Fig. 5 is a cross section on line 5—5 of Fig. 4; Fig. 6 is a longitudinal section through a completed seal embodying my invention, as resulting from the junction of the parts shown in Figs. 4 and 5; Fig. 7 is a cross section on line 7—7 of Fig. 6; Fig. 8 is a longitudinal section, of the same character as Fig. 6, but showing another form of seal made according to my invention, and Fig. 9 is a cross section on line 9—9 of Fig. 8.

The wire 10 consisting of tungsten, molybdenum or other suitable metal is first given a clean surface in any appropriate manner, for instance by heating the wire and coating it, while hot, with sodium nitrite, the wire being then dipped or quenched in water. If the operation has been successful, this will be indicated by a uniform silvery appearance of the entire surface of the wire. If the silvery appearance is not perfect or uniform the purifying operation just described is repeated.

The wire is then heated to a temperature depending on the character of the glass in which it is to be imbedded or sealed. While the wire is hot, I coil around it helically the glass which is to form the seal. This glass is in the form of an elongated body, such as a bar, strip or rod, preferably the latter, as indicated at 11 in Fig. 1. In order to soften the glass so that it may be readily bent and coiled on the wire, as at 11', the heat of a blow-pipe flame 12 or similar source of very concentrated heat is applied to that portion of the rod 11 which is close to the wire 10. The convolutions of the glass coil will adhere closely to each other as well as to the wire, so that a reliable and permanently effective seal will be produced. It will be understood that the metal and the glass employed will be so selected that their coefficients of expansion will bear the proper relation to each other, being preferably equal or approximately so.

The glass coil 11' in which the wire 10 has been imbedded or sealed is then heated so that it will form a tube 11'' (Fig. 2) by a fusing together of the adjacent coils. The coiling of the glass rod 11 on the wire 10 in the manner described, practically forces out every particle of air between the wire and the coil 11', so that when such coil is converted into the tube 11'' by fusing together adjacent convolutions as described, a perfect joint will be obtained between the wire and the glass tube 11'', as may be observed by the absence of any air bubbles in the glass tube, or between the tube and the wire. Such air bubbles would be detected readily by irregular refractions or reflections of light.

The intermediate product illustrated by Fig. 2 may be connected in various ways with the other parts of the apparatus. For instance, I may produce separately a sleeve such as shown in Fig. 3, comprising a narrow portion 13 into which the tube 11'' may be slipped with a slight clearance, and a wider portion 14. The portion 13 is preferably made of glass of the same character as that used for the coil 11'; if the wire 10 is a tungsten wire, the said coil and the sleeve portion 13 are preferably made of the soft glass known in the industry as 702ᴮ, while the sleeve portion 14 is preferably made of pyrex or other suitable hard glass. In order to obtain a good joint between the two sleeve portions 13 and 14, it is desirable that the narrow portion 13 be enlarged at the end adjoining the wide portion 14, so that the joint proper will be along a surface of greater diameter than the narrow sleeve portion; for instance, the joint may be in the plane indicated by a—a. The sleeve 13, 14 thus produced is slipped over the wire 10 until the glass tube 11″ is within the narrow sleeve portion 13, see Figs. 4 and 5. By the application of heat by means of a blow pipe or in any other suitable manner, the two nested layers 11″, 13 of similar glass are fused sufficiently to cause them to adhere to each other and practically form a unitary body. While the glass is in this soft condition, I prefer to flatten it by pinching it, preferably in two directions at right angles to each other, as indicated at 13′ and 13″ in Figs. 6 and 7. A better joint will thus be obtained. When the 702ᴮ glass and the tungsten wire have become cool, the said wire will have a uniform blood red appearance at the portion which is embedded or sealed in the glass. The other portion of the tungsten wire is grey or black.

According to another form of my invention, shown in Figs. 8 and 9, the narrow sleeve portion 13 is dispensed with, the tube 11″ (which in this case I prefer to make of the same glass as the relatively wide sleeve 14′, for instance pyrex) being connected by fusion directly with the adjacent end of said wide sleeve 14′. The tube 11″ is produced in the same manner as described above. In this case also, that glass portion which is fused to the sleeve may be pinched or flattened to obtain a better joint with said sleeve. The sleeve 14′ is connected with the tube 11″ at an enlarged portion 11ᵃ of said tube, it being noted that this enlargement is not at the very end of the tube, but the body of the tube projects along the wire 10 at both sides of said enlargement 11ᵃ. The joint between the sleeve and the tube is thus at a portion of enlarged diameter at a distance from the ends of the tube, and this insures a good joint; the making of a good joint offers special difficulties when both members to be joined consist of hard glass such as pyrex. The preferred way of making the enlargement 11ᵃ consists in coiling one or more turns of a glass rod around a portion of the tube 11″, and fusing it thereto, in the same manner that the tube 11″ was formed around the wire 10.

Generally the wide sleeve portion 14, or the sleeve 14′, is located at the outer end of the tube 11″, that is, the end farthest away from the chamber in which a vacuum prevails. Thus in Figs. 4 and 6, the narrow sleeve portion 13 (which fits close to the wire 10) would be at the vacuum chamber end of the wire 10. In the wide sleeve portion 14, or the sleeve 14′, there is a substantial clearance between the wire 10 and the surrounding glass. Of course, the glass rod 11 is coiled only on a portion of the wire 10, so that the latter projects from the glass tube 11″ at both ends thereof.

The outer or wide end of the sleeve portion 14, or the sleeve 14′, is subsequently connected by fusion or in any other suitable manner with the body 14″ of the apparatus to which my invention is applied, the joint being indicated at b—b in Fig. 8.

While I have mentioned specifically glass as the substance in which the metal wire or the like is sealed, I desire it to be understood that other fusible materials of vitreous characteristics might be employed.

Various modifications may be made without departing from the nature of my invention as set forth in the appended claims.

I claim:

1. The method of sealing an elongated metal member in a mass of vitreous material, which consists in coiling an elongated body of vitreous material around such metal member with the convolutions of the coil forming a continuous tubular body around said metal member.

2. The method of sealing an elongated metal member in a mass of vitreous material, which consists in heating said member and coiling around it helically, under the application of softening heat, an elongated body of vitreous material.

3. The method of sealing an elongated metal member in a mass of vitreous material, which consists in coiling an elongated body of vitreous material into tubular shape around a portion of said metal member, and then connecting the coiled tubular body thus formed, with a tubular member of vitreous material likewise surrounding said metal member.

4. The method of sealing an elongated metal member in a mass of vitreous material, which consists in coiling an elongated body of vitreous material into tubular shape around a portion of said metal member, inserting the article thus produced into a tubular member of vitreous material and connecting such tubular member with said tubular elongated body by heating and flattening.

5. The method of sealing an elongated metal member in a mass of vitreous material, which consists in coiling an elongated body of vitreous material into tubular shape around a portion of said metal member, heating said coil to cause its adjacent convolutions to adhere to each other, and then inserting the tubular body thus formed, into a sleeve of vitreous material and connecting it therewith.

6. The method of sealing an elongated metal member in a mass of vitreous material, which consists in coiling an elongated body of vitreous material into tubular shape around a portion of said metal member, placing a wide sleeve of vitreous material around another portion of said metal member, out of contact therewith, but in direct contact with the tubular body formed by the coiling of said elongated body of vitreous material, and connecting the contacting ends of said sleeve and coiled tubular body.

7. An elongated metal member sealed in a body of vitreous material coiled around said member.

8. An elongated metal member sealed in a body of elongated vitreous material coiled helically around said member and forming a continuous tube.

9. A structure comprising an elongated metal member, a tubular sealing body consisting of vitreous material coiled around a portion of said member, and a tubular member of vitreous material surrounding another portion of said metal member and connected with said sealing body.

10. A structure comprising an elongated metal member, a tubular sealing body consisting of vitreous material coiled around a portion of said member, a sleeve portion of vitreous material surrounding said sealing body, and another sleeve portion connected with said first mentioned sleeve portion and surrounding a different portion of said member.

11. A structure comprising an elongated metal member, a tubular sealing body consisting of vitreous material coiled around a portion of said member, a sleeve portion of vitreous material surrounding said sealing body, and another portion connected with said first-mentioned sleeve portion and surrounding a different portion of said metal member, out of contact therewith.

12. The method which consists in first connecting two tubular members of different diameters and of different kinds of vitreous material at an enlarged portion of that member which has the smaller diameter, then introducing into the last-mentioned member a wire a portion of which is surrounded by a sleeve of vitreous material adapted to fit into said member, and subsequently connecting said member with said sleeve.

In testimony whereof I have hereunto set my hand.

KARL WEIGELT.